Aug. 14, 1923.  
A. LEDERER  
1,464,826  
ELECTRIC INCANDESCENT LAMP  
Original Filed May 16, 1914
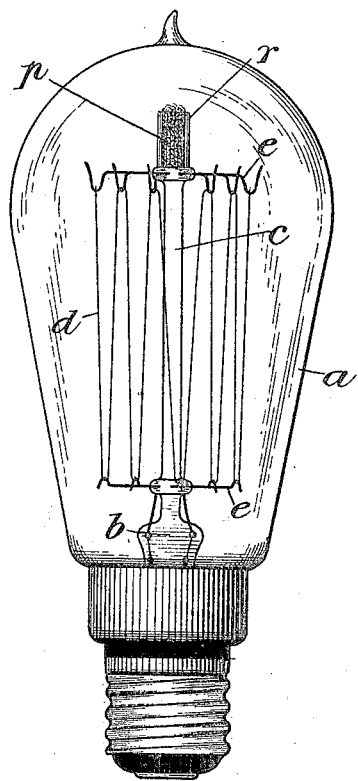
WITNESSES  
INVENTOR  
BY  
ATTORNEY Patented Aug. 14, 1923.

1,464,826

UNITED STATES PATENT OFFICE.

ANTON LEDERER, OF VIENNA, AUSTRIA, ASSIGNOR TO WESTINGHOUSE LAMP COMPANY, A CORPORATION OF PENNSYLVANIA.

ELECTRIC INCANDESCENT LAMP.

Application filed May 16, 1914, Serial No. 838,951. Renewed October 18, 1919. Serial No. 331,751.

*To all whom it may concern:*

Be it known that I, ANTON LEDERER, a subject of the Emperor of Austria, and a resident of Vienna, Austria, have invented certain new and useful Improvements in Electric Incandescent Lamps, of which the following is a specification.

My invention relates to electric incandescent lamps into which a chemically active substance is introduced during their process of manufacture for the purpose of maintaining their vacuum at its proper efficiency, and in particular to such lamps, wherein phosphorus is used as such chemically active substance.

Heretofore it has been customary to introduce phosphorus in a gaseous form during the process of evacuating the lamp for the purpose of obtaining a good vacuum therein, according to the well known Malignani process. It has also been proposed to introduce phosphorus into the lamp in solid form for the purpose of maintaining the vacuum thereof at its proper standard during the operation of the lamp.

For both purposes above described, amorphous red phosphorus, such as is obtainable ordinarily in commerce, has been used.

Such commercial amorphous red phosphorus, however, is strongly contaminated by the yellow and pink active modifications of phosphorus as well as by oxides of phosphorus, such as for instance, phosphorous acid, phosphoric acid, etc. (Compare Roscoe & Classen "Lehrbuch der anorganischen Chemie" 3rd edition, volume 1, page 535, and Gmelin-Kraut "Handbuch der anorganischen Chemie" 7th edition, volume 3, page 40.) Moreover the quantity of these impurities increases very rapidly, when such phosphorus is introduced into an incandescent lamp because, owing to the action of heat or light, a transformation of the amorphous red phosphorus into the modifications above mentioned takes place. I have found that these impurities exert a very deleterious influence on the useful life of electric incandescent lamps, as the metallic fialments or wires used as incandescing bodies become brittle after a short period of burning owing to the appearance of the well known phenomenon of crystallization; the lamps blacken and the impurities vaporize, a fact which is evidenced by the formation of deposits on the comparatively cool portions of the lamp bulb.

I have discovered that an increase of the said impurities owing to the transformation of the amorphous red phosphorus into the deleterious modifications mentioned above by means of the action of heat or light rays can be prevented when the phosphorus is protected by a screen which is opaque to chemically active rays. This screen may be arranged in a variety of ways, depending on the location of the phosphorus in the interior of the lamp. I prefer to locate the phosphorus in such a manner that it is contained in a small receptacle in the incandescent bulb, which container is open at the side away from the incandescent body, and which also consists wholly or partially of a material which screens the phosphorus from heat and light rays. I may, for instance, arrange such a receptacle for the phosphorus in the form of a small glass container at the top of the glass stem which supports the filament in the lamp and may make it of ruby glass or a similar material.

With such a construction, a great improvement was effected in the use of phosphorus as a clean-up or vacuum-improving material, in that the transformation of red phosphorus, as introduced, into an undesired form or forms, was prevented or retarded. Heretofore, when red phosphorus was used, even though carefully freed from the yellow modification by boiling with soda, a deposit of yellow phosphorus always appeared on the lamps after aging them. Although it is doubtful what the strictly correct explanation of the beneficial effect, resulting from enclosing the phosphorus in the ruby glass container is, yet the arrangement answers its techinal purpose, namely, to retard or prevent the transformation of red phosphorus to a less desirable form.

An arrangement of the form described is shown in the accompanying drawing where "a" represents the bulb and base of an incandescent lamp; "b" the glass stem; "c" the glass arbor; "d" the filament and "e" the anchors. A glass receptacle or tube "r" of ruby glass open at the top is fused to the end of the arbor "c" and contains the red phosphorus "p". Instead of using ordinary commercial red phosphorus, I may previously carefully purify the same, so as to get it free from all impurities and especially the modifications of phosphorus and oxides of phosphorus. This purification can be done in any usual manner. (Compare, for instance, Dammer "Handbuch der anorganischen Chemie" 1894, volume 2, part 1, page 92.) The use of such material prevents the deleterious influences mentioned above, attendant upon the use of commercial red phosphorus.

Although phosphorus is specified as the preferred vacuum maintaining or improving substance, I do not wish to be restricted thereto, as other similar vacuum-improving substances, deleteriously affected by light or heat rays, may be used in the same manner as phosphorus.

Having thus described my invention, I claim:

1. An incandescent electric lamp comprising a metallic filament and containing pure red phosphorus, held in a container composed of ruby glass which screens it from the light and heat emitted by the lamp, whereby transformation of the phosphorus to an undersirable form is retarded.

2. An incandescent electric lamp comprising an evacuated vessel containing an arbor supporting a metallic filament, a tube mounted on said arbor and containing pure red phosphorus, said tube being constructed of material shielding the same so as to retard deterioration thereof.

3. An incandescent electric lamp comprising an evacuated envelope enclosing an arbor supporting a metallic filament by means of anchors, a ruby glass tube mounted on said arbor and containing pure red phosphorus and adapted to shield the same from deleterious radiations from the filament when incandesced.

4. An incandescent electric lamp comprising an evacuated envelope, an arbor, supports, a metallic filament mounted thereon, a ruby glass receptacle mounted within said envelope and containing pure red phosphorus whereby the phosphorus is protected and deterioration due to radiations from the filament is retarded.

In testimony whereof I have hereunto subscribed my name this 23rd day of April 1914.

ANTON LEDERER.

Witnesses:
AUGUST FUGGER,
ORDA MARIA BERGER.